R. Carson,
Gang Plow.
No. 95,082. Patented Sep. 21, 1869.

Witnesses,
Phil. T. Dodge
L. Hailer

Inventor,
R. Carson
by Dodge & Munn
his Attys

UNITED STATES PATENT OFFICE.

ROBERT CARSON, OF MEREDOSIA, ILLINOIS.

IMPROVEMENT IN GANG-PLOWS.

Specification forming part of Letters Patent No. 95,082, dated September 21, 1869.

*To all whom it may concern:*

Be it known that I, ROBERT CARSON, of Meredosia, in the county of Morgan and State of Illinois, have invented certain new and useful Improvements in Gang-Plows; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to plows; and it consists in a novel manner of constructing and arranging a gang of plows for cultivating corn and cotton, as hereinafter described.

Figure 1:
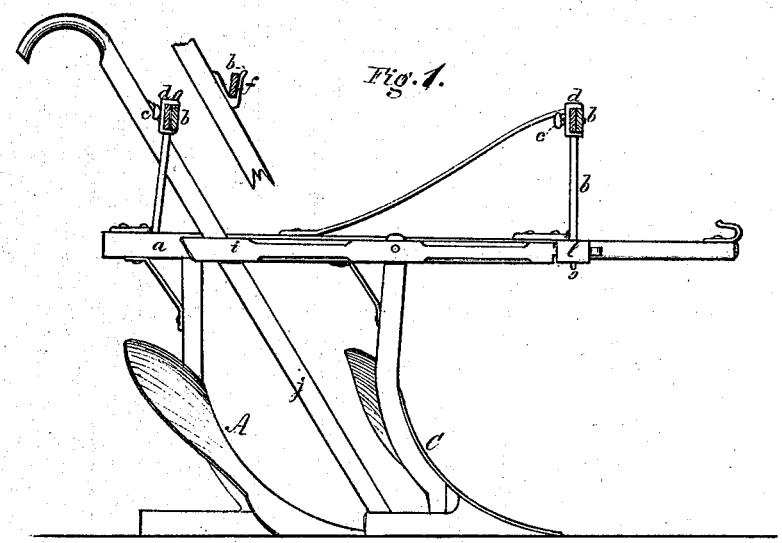
Figure 2:
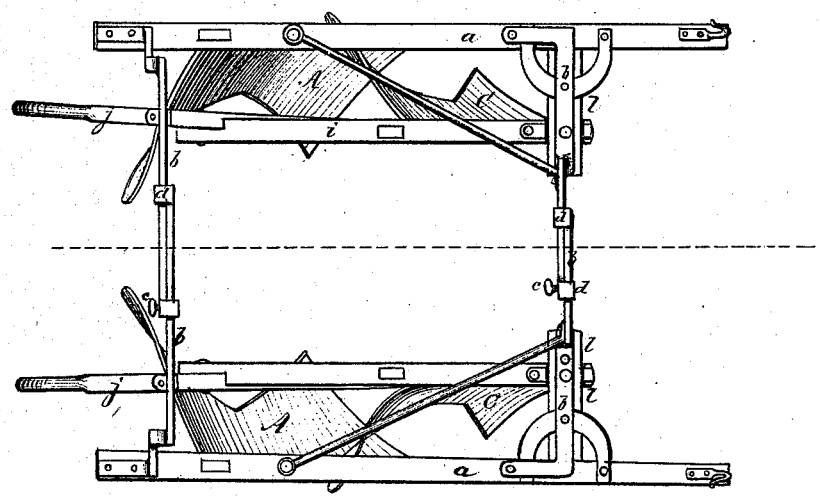

In the drawings, Figure 1 is a longitudinal section through the gang, taken on the line $x\ x$ of Fig. 2; and Fig. 2 is a top plan view of the same.

In constructing my gang I first provide two plows, A, one right and the other left handed, and arrange them parallel, and so as to turn their furrows inward toward each other. These plows I connect at each end by a pair of bars, $b$, which are made extensible by means of sliding heads $d$ and set-screws $c$, so that the plows may be fastened at any required distance apart. The middle portion of the bars $b$, I bow or bend upward, so as to allow them to pass over tall plants.

Near the forward end of each of the beams $a$ of the plows A, I attach an inwardly-projecting arm, $l$, and to the end of these arms I connect the beams $i$ of plows C. These plows are so connected to the arms $l$ that they can be moved both laterally and vertically, and are each provided with a handle, $j$, by which they are guided.

The plows C, I arrange to turn their furrows outward, as shown in Figs. 1 and 2, and on each of the handles $j$, I secure a hook, $f$, which may be engaged with the rear bars, $b$, when it is desired to hold the plows C out of the ground in turning the machine.

In operating the device a horse is attached to each of the beams $a$ and the machine drawn through the field, with one of the plows C passing each side of the row to be cultivated. The plows C loosen the earth and remove all weeds from around the plants, and the plows A, following immediately behind, throw fresh earth up around the plants.

By means of the handles $j$ the operator can guide the plows C to suit any irregularities of the row independently of each other and of plows A.

When operating in large corn, the plows C may be interchanged, and thus all four plows serve to "hill up" the corn.

By shortening the rear coupling, $b$, the plows C are caused to follow behind the plows A, and thus act as subsoil-plows.

A gang of this construction is strong, simple, and easily managed, and answers all the purposes of both a cultivator and a subsoil-plow.

Having thus described my invention, what I claim is—

The plows A, connected by the bent adjustable bars $b$, in combination with the intermediate plows, C, when arranged as herein described.

ROBERT CARSON.

Witnesses:
C. F. DIFFENBACHER,
JAMES COFFIN.